(12) United States Patent
Rao et al.

(10) Patent No.: US 11,050,660 B2
(45) Date of Patent: Jun. 29, 2021

(54) HOST DEVICE WITH MULTI-PATH LAYER IMPLEMENTING PATH SELECTION BASED AT LEAST IN PART ON FABRIC IDENTIFIERS

(71) Applicant: EMC IP Holding Company LLC, Hopkinton, MA (US)

(72) Inventors: Vinay G. Rao, Bangalore (IN); Subin George, Framingham, MA (US); Scott Rowlands, Marietta, GA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 16/145,502

(22) Filed: Sep. 28, 2018

(65) Prior Publication Data
US 2020/0106698 A1    Apr. 2, 2020

(51) Int. Cl.
*G06F 15/173* (2006.01)
*H04L 12/707* (2013.01)
(Continued)

(52) U.S. Cl.
CPC .............. *H04L 45/24* (2013.01); *H04L 45/14* (2013.01); *H04L 45/70* (2013.01); *H04L 47/125* (2013.01); *H04L 67/1097* (2013.01)

(58) Field of Classification Search
CPC ..... H04L 45/24; H04L 45/14; H04L 67/1097; H04L 45/70; H04L 47/125
(Continued)

(56) References Cited

U.S. PATENT DOCUMENTS

| 6,567,397 B1 | 5/2003 | Campana et al. |
| 6,687,746 B1 | 2/2004 | Shuster et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

U.S. Appl. No. 16/155,491, filed in the name of Kundan Kumar et al. on Oct. 9, 2018 and entitled "Migrating Control of a Multi-Path Logical Device from a Current MPIO Driver to a Target MPIO Driver."

(Continued)

*Primary Examiner* — Thuong Nguyen
(74) *Attorney, Agent, or Firm* — Ryan, Mason & Lewis, LLP (57) ABSTRACT

An illustrative embodiment includes a host device configured to communicate over a network with a storage system comprising a plurality of storage devices. The host device comprises a set of input-output queues and a multi-path input-output driver configured to select input-output operations from the set of input-output queues for delivery to the storage system over the network. The multi-path input-output driver is further configured to determine fabric identifiers for respective ones of a plurality of paths from the host device to the storage system, and to select particular ones of the paths for delivery of the input-output operations to the storage system based at least in part on the fabric identifiers. The fabric identifiers may be determined for the respective paths, for example, based at least in part on responses to a predetermined command sent over the paths by the multi-path input-output driver.

20 Claims, 3 Drawing Sheets

(51) Int. Cl.
*H04L 12/721* (2013.01)
*H04L 12/803* (2013.01)
*H04L 29/08* (2006.01)

(58) Field of Classification Search
USPC ........ 709/238, 224, 217, 225; 370/241, 396, 370/401, 254
See application file for complete search history.

(56) References Cited

U.S. PATENT DOCUMENTS

| | | | |
|---|---|---|---|
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,633,955 | B1 * | 12/2009 | Saraiya ................. H04L 49/356 370/395.31 |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,400,611 | B1 | 7/2016 | Raizen |
| 9,594,780 | B1 | 3/2017 | Esposito et al. |
| 9,647,933 | B1 | 5/2017 | Tawri et al. |
| 9,778,852 | B1 | 10/2017 | Marshak et al. |
| 9,806,949 | B2 * | 10/2017 | Addanki ............. H04L 41/0886 |
| 10,055,241 | B1 * | 8/2018 | DeSanti ............. G06F 9/45558 |
| 10,243,823 | B1 * | 3/2019 | Bharadwaj .......... H04L 67/1097 |
| 10,289,325 | B1 | 5/2019 | Bono |
| 10,353,714 | B1 | 7/2019 | Gokam et al. |
| 10,439,878 | B1 * | 10/2019 | Tah ......................... H04L 69/18 |
| 10,474,367 | B1 | 11/2019 | Mallick et al. |
| 10,476,960 | B1 | 11/2019 | Rao et al. |
| 10,521,639 | B2 | 12/2019 | Mallick et al. |
| 2002/0023151 | A1 | 2/2002 | Iwatani |
| 2002/0103923 | A1 | 8/2002 | Cherian et al. |
| 2003/0142628 | A1 * | 7/2003 | Alonso ................... H04L 29/06 370/241 |
| 2004/0010563 | A1 | 1/2004 | Forte et al. |
| 2004/0117369 | A1 * | 6/2004 | Mandal ................. G06F 3/0605 |
| 2005/0268145 | A1 * | 12/2005 | Hufferd ............... G06F 11/1443 714/2 |
| 2006/0026346 | A1 | 2/2006 | Kadoiri et al. |
| 2006/0072587 | A1 * | 4/2006 | Ramaswamy ........ H04L 49/357 370/396 |
| 2006/0271639 | A1 * | 11/2006 | Kumagai ............ H04L 67/1097 709/217 |
| 2006/0277383 | A1 | 12/2006 | Hayden et al. |
| 2007/0168507 | A1 * | 7/2007 | Das ........................ H04L 63/104 709/225 |
| 2007/0174849 | A1 | 7/2007 | Cheung et al. |
| 2008/0043973 | A1 | 2/2008 | Lai et al. |
| 2008/0201458 | A1 | 8/2008 | Salli |
| 2010/0247094 | A1 * | 9/2010 | Young ...................... H04L 45/24 398/25 |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2013/0117766 | A1 | 5/2013 | Bax et al. |
| 2014/0105068 | A1 | 4/2014 | Xu |
| 2014/0169214 | A1 * | 6/2014 | Nakajima ........... H04L 67/1097 370/254 |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0105240 | A1 * | 4/2016 | Yang .................. H04Q 11/0067 398/68 |
| 2016/0117113 | A1 | 4/2016 | Li et al. |
| 2016/0291885 | A1 * | 10/2016 | Pendharkar ......... G06F 13/4027 |
| 2016/0335003 | A1 | 11/2016 | Ahmed et al. |
| 2017/0180271 | A1 * | 6/2017 | Wilkinson .............. H04L 69/22 |
| 2017/0235503 | A1 * | 8/2017 | Karr ..................... G06F 3/0619 711/114 |
| 2017/0235507 | A1 | 8/2017 | Sinha et al. |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0095299 | A1 | 3/2019 | Liu et al. |
| 2019/0108888 | A1 | 4/2019 | Sarkar et al. |
| 2019/0173807 | A1 * | 6/2019 | Balan .................. H04L 67/2852 |
| 2019/0334987 | A1 * | 10/2019 | Mallick .............. H04L 67/1097 |
| 2019/0356551 | A1 * | 11/2019 | Lekshmanan ......... H04L 43/045 |
| 2020/0106698 | A1 * | 4/2020 | Rao ..................... H04L 67/1097 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

U.S. Appl. No. 16/155,429, filed in the name of Rimpesh Patel et al. on Oct. 9, 2018 and entitled "Categorizing Host IO Load Pattern and Communicating Categorization to Storage System."

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

U.S. Appl. No. 15/849,828, filed in the name of Sanjib Mallick et al. on Dec. 21, 2017 and entitled "Storage System with Input-Output Performance Control Utilizing Application Process Detection."

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

U.S. Appl. No. 15/795,653, filed in the name of Maneesh Pusalkar et al. on Oct. 27, 2017 and entitled "Storage System with Network-Wide Configurable Device Names."

U.S. Appl. No. 16/142,274, filed in the name of Sanjib Mallick et al. on Sep. 26, 2018 and entitled "Host Device with Multi-Path Layer Implementing Automatic Standby Setting for Active-Active Configuration."

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMWARE, Inc. "VMware VMFS Volume Management," 2009, 8 pages.

* cited by examiner

HOST DEVICE WITH MULTI-PATH LAYER IMPLEMENTING PATH SELECTION BASED AT LEAST IN PART ON FABRIC IDENTIFIERS

FIELD

The field relates generally to information processing systems, and more particularly to storage in information processing systems.

BACKGROUND

Storage arrays and other types of storage systems are often shared by multiple host devices over a network. However, problems can arise in such arrangements when paths from one or more of the host devices to the storage system experience performance degradations. In some cases, the performance degradations may be related to network switch fabric reconfigurations. For example, fabric reconfigurations can necessitate a fabric rediscovery process in which potentially large numbers of required state change notification (RSCN) messages are generated and transmitted over a given fabric. Conventional techniques are unable to adequately detect and alleviate these and other fabric-related performance degradations.

SUMMARY

Illustrative embodiments configure a multi-path layer of one or more host devices to include functionality for path selection based at least in part on fabric identifiers of respective paths through a storage area network (SAN) or other type of network over which the one or more host devices communicate with a storage array or other type of storage system. The multi-path layer illustratively comprises at least one multi-path input-output (MPIO) driver configured to process input-output (IO) operations of at least one host device. The multi-path layer in such arrangements can be configured to determine fabric names or other types of fabric identifiers for respective paths, and to adjust path selection in a manner that takes into account the fabric identifiers of the respective paths.

Such embodiments advantageously allow the MPIO driver to minimize or otherwise avoid selection of paths associated with a fabric that is currently exhibiting a performance degradation due to an ongoing fabric rediscovery process or other fabric-related issue. As a result, improved performance in processing of IO operations is achieved.

In one embodiment, an apparatus comprises a host device configured to communicate over a network with a storage system comprising a plurality of storage devices. The host device includes a set of IO queues and an MPIO driver configured to select IO operations from the set of IO queues for delivery to the storage system over the network. The MPIO driver is further configured to determine fabric identifiers for respective ones of a plurality of paths from the host device to the storage system, and to select particular ones of the paths for delivery of the IO operations to the storage system based at least in part on the fabric identifiers.

The fabric identifiers may be determined for the respective paths, for example, based at least in part on responses to a predetermined command sent over the paths by the MPIO driver. The predetermined command illustratively comprises a Small Computer System Interface (SCSI) command of a particular type, such as a log sense command, a mode sense command, or a vendor unique (VU) command.

The network illustratively comprises a SAN and the fabrics illustratively comprise respective distinct switch fabrics of a set of multiple switch fabrics interconnecting the host device with the storage system over the SAN.

The paths from the host device to the storage system for which respective fabric identifiers are determined in some embodiments therefore comprise respective SAN paths, although other types of network paths can be used in other embodiments. The paths are illustratively associated with respective initiator-target pairs, with the initiators being implemented on the host device and the targets being implemented on the storage system. For example, the initiators of the initiator-target pairs illustratively comprise respective host bus adaptors (HBAs) of the host device and the targets of the initiator-target pairs illustratively comprise respective storage array ports of the storage system.

In some embodiments, the MPIO driver in selecting particular ones of the paths for delivery of the IO operations to the storage system based at least in part on the fabric identifiers is further configured, for example, to identify a first path that is exhibiting a delayed response time, and to select paths having respective fabric identifiers that are different than the fabric identifier of the first path.

As another example, the MPIO driver in selecting particular ones of the paths for delivery of the IO operations to the storage system based at least in part on the fabric identifiers is further configured to identify a first path on which a particular IO operation has failed, and to retry the particular IO operation using another path having a different fabric identifier than the fabric identifier of the first path.

As yet another example, the MPIO driver in selecting particular ones of the paths for delivery of the IO operations to the storage system based at least in part on the fabric identifiers is further configured to implement a path selection algorithm that selects particular ones of the paths at least in part as a function of their respective fabric identifiers. In such an arrangement, the path selection algorithm can be configured to balance the IO operations over the fabrics, possibly using round robin selection or other types of path selection algorithms based at least in part on fabric identifiers.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
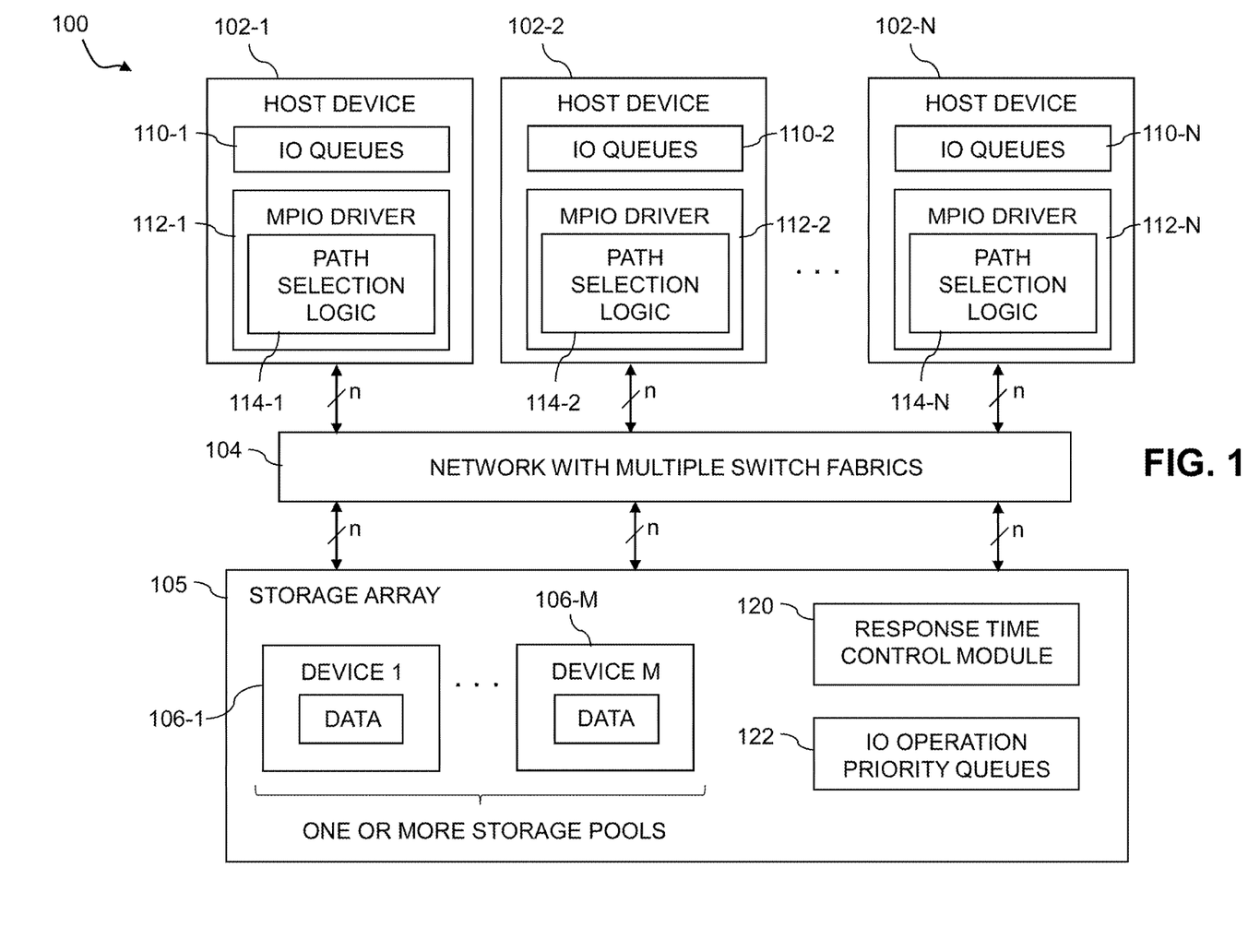
FIG. 1 is a block diagram of an information processing system configured with functionality for fabric-based path selection utilizing a multi-path layer of a host device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a network 104 with at least one storage array 105. The network 104 comprises multiple switch fabrics. For example, the network 104 illustratively comprises at least one storage area network (SAN) and the fabrics illustratively comprise respective distinct switch fabrics of a set of multiple switch fabrics interconnecting one or more of the host devices 102 with the storage array 105 over the one or more SANs.

The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

Although illustratively shown as separate from the network 104 in the figure, at least portions of the storage array 105 may be considered part of the network 104 in some embodiments. For example, in embodiments in which the network 104 comprises at least one SAN, the storage array 105 may be viewed as part of the SAN.

The storage devices 106 of the storage array 105 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths. As illustrated in the figure, each of the host devices 102 illustratively has n paths to the storage array 105 via the network 104, although numerous other arrangements are possible. For example, different ones of the host devices 102 can have different numbers and types of paths to the storage array 105.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The network 104 may be implemented using multiple networks of different types to interconnect storage system components. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides fabric-based path selection functionality using respective instances of path selection logic 114-1, 114-2, . . . 114-N implemented within the MPIO drivers 112.

The MPIO drivers 112 may comprise, for example, otherwise conventional MPIO drivers, such as PowerPath drivers from Dell EMC, suitably modified in the manner disclosed herein for fabric-based path selection. Other types of MPIO drivers from other driver vendors may be suitably modified to incorporate fabric-based path selection functionality as disclosed herein.

The MPIO driver 112-1 is configured to select IO operations from its corresponding set of IO queues 110-1 for delivery to the storage array 105 over the network 104. The sources of the IO operations stored in the set of IO queues 110-1 illustratively include respective processes of one or more applications executing on the host device 102-1. Other types of sources of IO operations may be present in a given implementation of system 100.

The MPIO driver 112-1 is further configured to determine fabric identifiers for respective ones of a plurality of paths from the host device 102-1 to the storage array 105 through the network 104, and to select particular ones of the paths for delivery of the IO operations to the storage array 105 based at least in part on the fabric identifiers.

As mentioned previously, the network 104 in the present embodiment illustratively comprises at least one SAN and the multiple fabrics of the network 104 illustratively comprise respective distinct switch fabrics of a set of multiple switch fabrics interconnecting the host device 102-1 with the storage array 105 over the SAN. Each of the multiple switch fabrics has a distinct fabric identifier which is assumed to be globally unique within the information processing system 100. The term "fabric identifier" as used herein is intended to be broadly construed so as to encompass a fabric name or other type of information suitable for identifying a corresponding network switch fabric for purposes of fabric-based path selection. Each of the paths between the host device 102-1 and the storage array 105 is assumed to be associated with only a single one of the multiple fabrics at a given point in time, although it is to be appreciated that the association of paths with respective fabrics can change over time, for example, as paths and/or fabrics are added to and/or removed from the system 100.

In determining the fabric identifiers for respective ones of the plurality of paths from the host device 102-1 to the storage array 105, the MPIO driver 112-1 illustratively sends a predetermined command over each of the paths, and determines the fabric identifiers for the respective paths based at least in part on responses to the predetermined command. The plurality of paths need not include all of the paths from the host device 102-1 to the storage array 105, but could instead include only a selected subset thereof. For example, the determination of fabric identifiers could be performed for different subsets of paths in different fabric identification periods. Alternatively, fabric identifiers could be determined for all of the paths in each of the periods.

The predetermined command utilized for determining fabric identifiers of respective paths illustratively comprises a SCSI command of a particular type, such as a log sense command or a mode sense command.

Other types of SCSI or non-SCSI commands may be used in other embodiments, including commands that are part of a standard command set, or custom commands such as a "vendor unique command" or VU command that is not part of a standard command set. The term "predetermined command" as used herein is therefore intended to be broadly construed, so as to encompass, for example, a predetermined composite command that comprises a combination of multiple individual commands.

The paths over which the predetermined command is sent from the host device 102-1 to the storage array 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage array 105. As noted above, the storage devices 106 illustratively comprise LUNs or other types of logical storage devices.

By way of example, in selecting particular ones of the paths for delivery of the IO operations to the storage array 105 based at least in part on the fabric identifiers, the path selection logic 114-1 of the MPIO driver 112-1 illustratively identifies a first path that is exhibiting a delayed response time, and selects paths having respective fabric identifiers that are different than the fabric identifier of the first path.

As another example, in selecting particular ones of the paths for delivery of the IO operations to the storage array 105 based at least in part on the fabric identifiers, the path selection logic 114-1 of the MPIO driver 112-1 illustratively identifies a first path on which a particular IO operation has failed, and retries the particular IO operation using another path having a different fabric identifier than the fabric identifier of the first path. The failure of the particular IO operation can be indicated, for example, by failure of the host device 102-1 to receive an expected response from the storage array 105 within a designated timeout period after sending the IO operation to the storage array 105.

As yet another example, in selecting particular ones of the paths for delivery of the IO operations to the storage array 105 based at least in part on the fabric identifiers, the path selection logic 114-1 of the MPIO driver 112-1 illustratively implements a path selection algorithm that selects particular ones of the paths at least in part as a function of their respective fabric identifiers, with the path selection algorithm being configured to balance the IO operations over the fabrics or to achieve other fabric-based selection goals.

In some embodiments, the path selection algorithm also takes into account additional path information other than the fabric, such as host device HBA and storage array port. For example, the path selection logic 114-1 can incorporate the use of fabric identifiers into a path selection algorithm that is based on host device HBA and storage array port. A given retry of a failed IO operation under such a path selection algorithm can select a path having a different fabric, host device HBA and storage array port for a given retry than that of the path selected for the original failed IO operation.

The MPIO driver 112-1 in illustrative embodiments is not aware of the switch fabric details associated with a particular path and its kernel-space portions cannot readily communicate with an HBA to obtain such details. However, the storage array 105 generally has information regarding the switch fabric to which each HBA is attached, and the MPIO driver 112-1 can therefore query the storage array 105 for that information via the above-described predetermined command for fabric identifier determination.

With regard to response time degradations, the determination of a delayed response time for a particular path associated with a given one of the fabrics can be achieved using a variety of techniques implemented under the control of the MPIO driver 112-1.

For example, in determining if any paths are experiencing a response time degradation, the MPIO driver 112-1 illustratively sends another predetermined command to the storage array 105 over each of a plurality of paths from the host device 102-1 to the storage array 105, monitors a response time for the other predetermined command on each of the paths, and detects a performance issue with at least a given one of the paths based at least in part on the monitored response time.

The predetermined command for detection of response time degradation may be sent periodically over the paths, or under other specified conditions suitable for efficient monitoring of response times. In some embodiments, the predetermined command may be sent on each of the paths in each of a plurality of different periods of time. The different periods of time need not be of the same duration, and the particular set of paths over which the predetermined command is sent can vary from period to period.

The predetermined command for detection of response time degradation is illustratively different than the previously-described predetermined command used for determination of fabric identifiers. For example, the predetermined command for detection of response time degradation illustratively comprises a particular type of command selected to elicit a substantially immediate response from the storage array 105 such that the monitored response time is primarily comprised of path delay rather than storage array delay. Such a command is also referred to herein as an "immediate" command, as it elicits a substantially immediate response from the storage array 105, thereby allowing the MPIO driver 112-1 to utilize the monitored response time for a given one of the paths to characterize the delay of the given path.

In some embodiments, the predetermined command for detection of response time degradation also comprises a SCSI command of a particular type. For example, the predetermined command for detection of response time degradation illustratively comprises at least one of a Test Unit Ready (TUR) command, an Inquiry command, and a Read Capacity command. These are all examples of SCSI "immediate" commands. Again, other types of SCSI or non-SCSI commands may be used in other embodiments, including commands that are part of a standard command set, or custom commands such as a "vendor unique command" or VU command that is not part of a standard command set.

Although different predetermined commands are used for determination of fabric identifier and detection of response time degradation in the embodiments described above, it is possible that a single predetermined command, possibly in the form of a combination of multiple distinct sub-commands, can be used to perform both functions.

As noted above, the paths between the host devices 102 and the storage array 105 can change over time. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In detecting a performance issue for a given one of the paths based at least in part on its monitored response time, the MPIO driver 112-1 is illustratively configured to determine a current response time for the given path from a response by the storage array 105 to a current instance of the predetermined command for detection of response time degradation, to compare the current response time to a previous response time for the given path as determined from a response by the storage array 105 to a previous instance of the predetermined command for detection of response time degradation, and responsive to the current response time being greater than the previous response time by more than a threshold amount, detecting the performance issue with the given path.

Alternative detection techniques based at least in part on monitored response time to one or more instances of the predetermined command for detection of response time degradation can be used. For example, a performance issue for a given path may be detected if its monitored response time in a current period exceeds a specified threshold, without reference to a response time differential relative to any previous period.

In some embodiments, the host device 102-1 is configured to generate a notification for delivery to a host administrator responsive to detection of the performance issue with the given path. Additionally or alternatively, the host device 102-1 may be configured to generate a notification for delivery to the storage array 105 responsive to detection of the performance issue with the given path. Other types of reporting arrangements can be utilized in other embodiments, some of which involve mapping of storage devices to processes and mapping of processes to applications.

The above-described functions associated with fabric-based path selection functionality of the MPIO driver 112-1 are illustratively carried out at least in part under the control of its path selection logic 114-1. For example, the path selection logic 114-1 is illustratively configured to control performance of the steps of the flow diagram to be described below in conjunction with FIG. 2.

It is assumed that each of the other MPIO drivers 112 is configured in a manner similar to that described above and elsewhere herein for the first MPIO driver 112-1. The other host devices 102 of the system 100 are therefore also configured to communicate over the network 104 with the storage array 105, and the MPIO drivers 112 of such other host devices are each similarly configured to select IO operations from its corresponding one of the sets of IO queues 110 for delivery to the storage array 105 over the network 104 and to perform the disclosed fabric-based path selection functionality. Accordingly, fabric-based path selection functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support fabric-based path selection.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of the fabric-based path selection techniques in a multi-path layer as disclosed herein, it can be difficult to detect and alleviate fabric-related performance degradations, such as those resulting from network switch fabric reconfigurations. For example, fabric reconfigurations can necessitate a fabric rediscovery process in which potentially large numbers of RSCN messages are generated and transmitted over a given fabric, also referred to herein as an "RSCN storm." During such an RSCN storm, IO operations are not being serviced by the given fabric, potentially leading to a significant adverse performance impact within the system. If the fabric is sufficiently large, the RSCN storm can last tens of seconds and lead to numerous timeouts of IO operations. Under conventional practice, IO operations subject to timeout may be resent over the same fabric that is currently experiencing the RSCN storm. This can lead to failures of such retries, potentially causing an application failure and further exacerbating the problem. Similar problems can result from other types of fabric-related issues within the system.

Performance degradations associated with RSCN storms and other fabric-related issues are advantageously detected and alleviated in illustrative embodiments herein by utilization of a multi-path layer comprising one or more of the MPIO drivers 112 to select paths based at least in part on fabric identifiers as described above. For example, illustrative embodiments ensure that the fabric-based path selection for retries of failed IO operations will have a higher chance of succeeding in cases in which the original IO failure was due to a fabric-related issue. Additionally or alternatively, fabric-based path selection can incorporate round robin or other types of selection of paths over a given set of fabrics, for example, to distribute the IO processing load over the set of fabrics in a particular manner.

Such functionality can be implemented with a wide variety of different storage arrays or other types of storage systems, potentially utilizing standardized or vendor unique commands such as SCSI commands.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, network 104, storage array 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices such as LUNs or other logical storage volumes.

Figure 2:
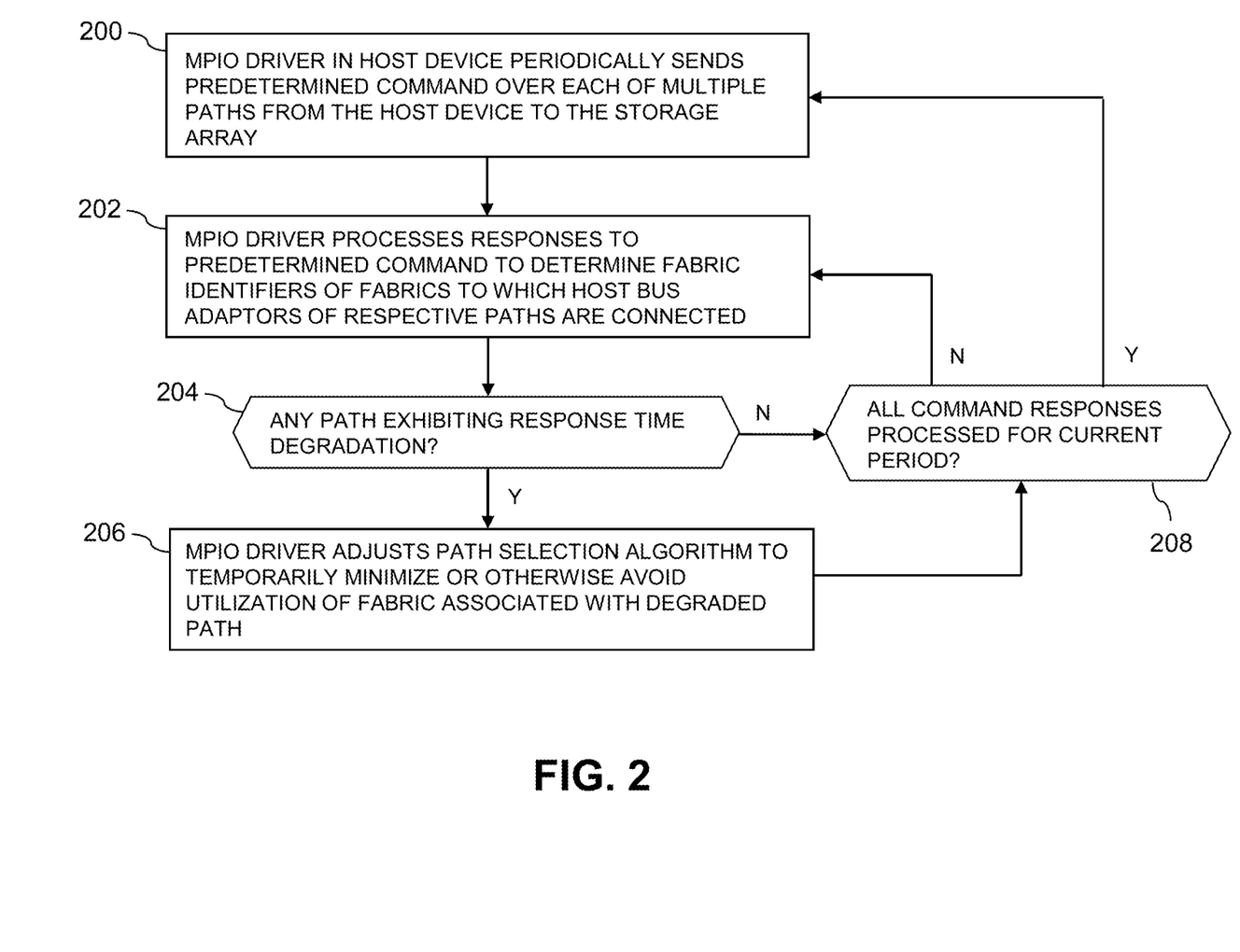
FIG. 2 is a flow diagram of a process for fabric-based path selection utilizing a multi-path layer of a host device in an illustrative embodiment.

The steps of the FIG. 2 process are illustratively performed primarily by or under the control of an MPIO driver of a given host device, although other arrangements of system components can perform at least portions of one or more of the steps in other embodiments. This embodiment further assumes that the commands utilized by the host devices in generating IO operations such as read and write operations directed to the storage array comprise SCSI commands, although other types of commands can be used.

In step 200, the MPIO driver in the host device periodically sends a predetermined command over each of multiple paths from the host device to the storage array. This particular predetermined command is a type of predetermined command utilized to determine fabric identifiers for respective paths in the manner described previously. Other types of predetermined commands can be used for other purposes, such as determining if any path is exhibiting a response time degradation.

At least some of the paths from the host device to the storage array may be determined using an initial path discovery scan performed in conjunction with booting of the host device. It is assumed for the description of this embodiment that the host device has discovered a plurality of paths to the storage array, and further that at least one storage device of the storage array is visible to the host device on each of the paths. Moreover, it is assumed that different ones of the paths are associated with respective different fabrics of a network that comprises multiple switch fabrics, such as network 104 of system 100.

The path discovery scan can be repeated responsive to one or more detected path changes or under other specified conditions. For example, a storage administrator or other user may perform zoning and/or masking changes to the storage array that result in at least one new path becoming available to the host device. Accordingly, the set of multiple paths over which the predetermined command is periodically sent by the host device to the storage array can change over time.

In step 202, the MPIO driver processes responses to the predetermined command sent over each of the multiple paths in order to determine fabric identifiers of respective fabrics to which HBAs of respective ones of the paths are connected.

In step 204, a determination is made as to whether or not any path or paths are exhibiting a response time degradation, possibly using a different predetermined command than that used to determine the fabric identifiers. If there are one or more paths exhibiting a response time degradation, the process moves to step 206, and otherwise moves to step 208.

The determination in step 204 illustratively involves the MPIO driver monitoring response time for a predetermined command for detecting response time degradation on each of the paths. For example, the MPIO driver can determine a transmit timestamp associated with transmission of the predetermined command for detection of response time degradation over a given path, determine a receive timestamp associated with receipt of a response to the predetermined command over the given path, and compute the response time as the difference between the receive timestamp and the transmit timestamp. Numerous other techniques can be used to monitor response times for the predetermined command for detection of response time degradation over respective ones of the paths between the host device and the storage array.

In some embodiments, all detected response time degradations can be compared to a specified threshold, with only those response time degradations that exceed the threshold contributing to a possible affirmative determination in step 204. Accordingly, the determination in step 204 can utilize one or more thresholds so as to limit affirmative determinations to cases of substantial response time degradations.

For example, the detection of a performance issue with a given path in this embodiment illustratively comprises determining a current response time for the given path from the response by the storage array to a current instance of the predetermined command for detection of response time degradation, comparing the current response time to a previous response time for the given path as determined from a response by the storage array to a previous instance of the predetermined command, and responsive to the current response time being greater than the previous response time by more than a threshold amount, detecting the performance issue with the given path. The difference between the current response time and the previous response time provides the above-noted response time differential in this example. Other performance issue detection techniques utilized in other embodiments can be based on the response time of a single period rather than on a differential response time between periods.

In step 206, the MPIO driver adjusts a path selection algorithm to temporarily minimize or otherwise avoid utilization of the fabric associated with the degraded path or paths detected in step 204. For example, the path selection algorithm may be adjusted such that no IO operations or only a minimal number of IO operations are sent over paths corresponding to the fabric of concern. Alternatively, the paths corresponding to that fabric can be assigned a lower priority than those paths would otherwise have in the path selection algorithm. The adjustment made in step 206 can be automatically reversed after a particular period of time, such as the expected amount of time required to complete a fabric discovery process given the size and configuration of the fabric in question. Thus, after the expected amount of time of a potential RSCN storm on that fabric has passed, the path selection algorithm can return to selecting paths associated with that fabric in the normal manner. Other arrangements are possible. For example, the adjustment made in step 206 can be reversed responsive to detection of a reversal of the previously-detected response time degradation for the path or paths.

In step 208, a determination is made as to whether or not all command responses for a current period have been processed. If all command responses for the current period have not been processed, the process returns to step 202 as indicated to process one or more additional command responses. Otherwise, the process returns to step 200 to send additional instances of the predetermined command for determination of fabric identifiers for the next period.

Multiple additional instances of the FIG. 2 process are assumed to be performed in respective additional host devices that share the storage array.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and fabric-based path selection functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different fabric-based path selection arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
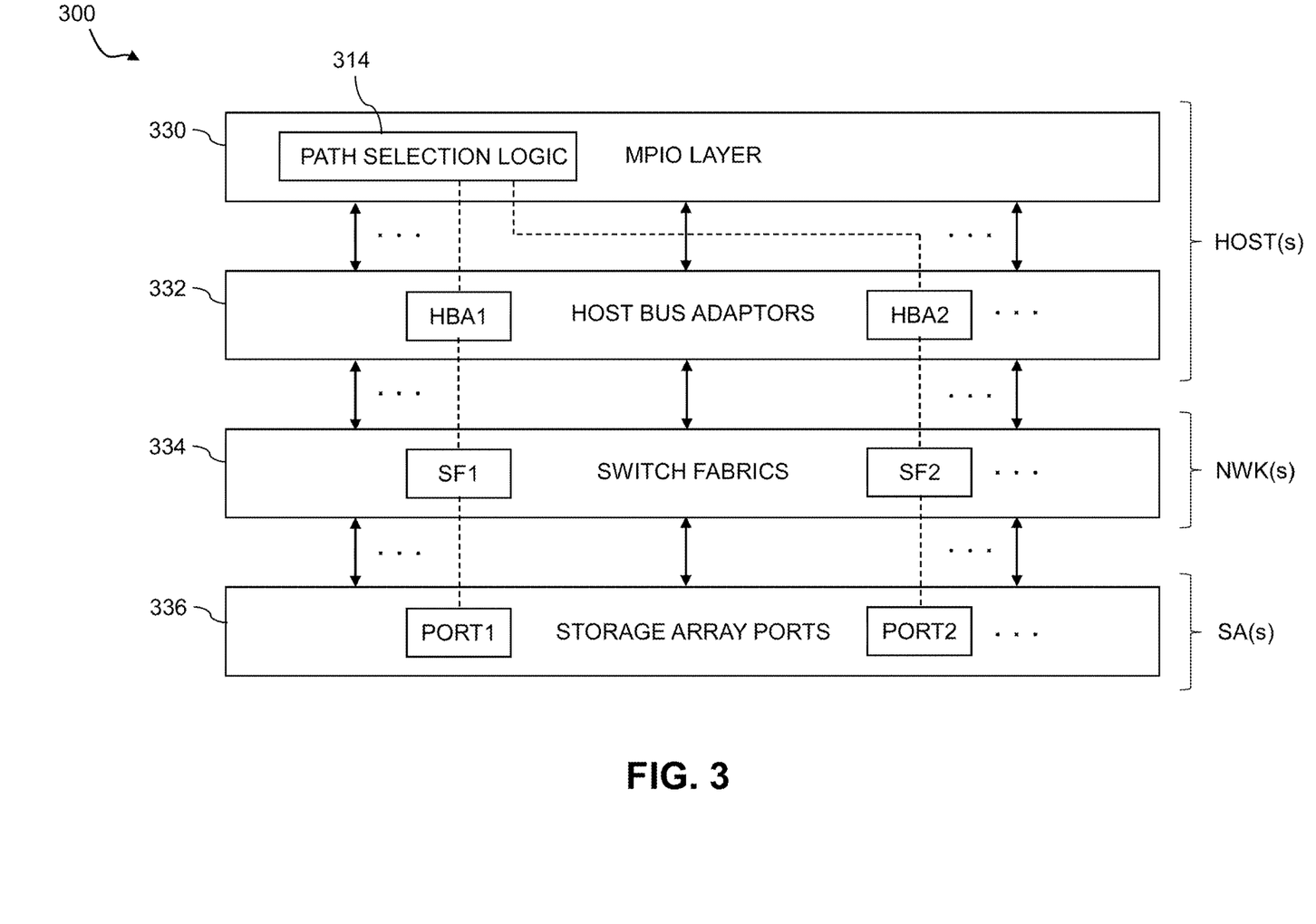
FIG. 3 is a block diagram showing multiple layers of a layered system architecture that includes a multi-path layer with fabric-based path selection functionality in an illustrative embodiment.

Referring now to FIG. 3, another illustrative embodiment is shown. In this embodiment, and information processing system 300 comprising at least one instance of fabric-based path selection logic 314 is configured in accordance with a layered system architecture that includes an MPIO layer 330, an HBA layer 332, a switch fabric layer 334 and a storage array port layer 336. The MPIO layer 330 and the HBA layer 332 are associated with one or more host devices, the switch fabric layer 334 is associated with one or more SANs or other types of networks, and the storage array port layer 336 is associated with one or more storage arrays ("SAs"). The MPIO layer 330 is an example of what is also referred to herein as a multi-path layer, and comprises one or more MPIO drivers implemented in respective host devices. Each such MPIO driver illustratively comprises an instance of path selection logic 314 configured substantially as previously described. Additional or alternative layers and path selection logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2. These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, as in the FIG. 1 embodiment, or alternatively different ones of the host devices can have different numbers and types of paths to the storage array.

The path selection logic 314 of the MPIO layer 330 in this embodiment selects paths for delivery of IO operations to the one or more storage arrays having the storage array ports of the storage array port layer 336. The path selection is based at least in part on fabric identifiers determined for respective ones of a plurality of paths from the corresponding host device to the one or more storage arrays.

For example, the path selection logic 314 illustratively associates each of the two paths shown in the figure with its corresponding fabric identifier SF1 or SF2. The fabric identifier for a given path is illustratively determined by sending a predetermined command over each path, and processing the corresponding responses received over each path.

The path selection logic 314 also illustratively has information indicating any particular path that may be exhibiting a response time degradation. Such information is determined utilizing other predetermined commands for detection of response time degradation, although it is possible in some embodiments that the same predetermined commands can be used both for fabric identifier determination and detection of response time degradation.

The path selection logic 314 then utilizes the fabric identifiers and the information indicating any response time degradations in selecting paths for sending IO operations to the one or more storage arrays.

For example, if the first path associated with fabric identifier SF1 is exhibiting a delayed response time, the path selection logic 314 illustratively prioritizes for selection one or more other paths having different fabric identifiers, such as the second path associated with fabric identifier SF2. This avoids situations in which paths associated with a given switch fabric are repeatedly selected even though that fabric is currently experiencing an RSCN storm or other type of fabric-related performance degradation.

As another example, if the first path associated with fabric identifier SF1 has resulted in a failed IO operation, the path selection logic 314 does not retry the IO operation over another path associated with the same fabric identifier SF1, but instead selects another path having a different fabric identifier, such as the second path associated with fabric identifier SF2. This avoids situations in which retries are sent over the same fabric that is currently experiencing an RSCN storm or other type of fabric-related performance degradation.

These and a wide variety of other types of adjustments can be made in a path selection algorithm or other path selection mechanism of the path selection logic 314 to take fabric identifiers into account in the path selection process.

As mentioned previously, different instances of the above-described path selection process can be performed by different MPIO drivers in different host devices.

The particular fabric-based path selection arrangements described above are presented by way of illustrative example only. Numerous alternative arrangements of these and other features can be used in implementing fabric-based path selection in other embodiments.

The illustrative embodiments disclosed herein can provide a number of significant advantages relative to conventional arrangements. For example, some embodiments configure a multi-path layer of one or more host devices to include functionality for fabric-based path selection in a SAN or other type of network over which the one or more host devices communicate with a storage array or other type of storage system. The multi-path layer in such arrangements can be configured to determine fabric names or other types of fabric identifiers for respective paths, and to adjust path selection in a manner that takes into account the fabric identifiers of the respective paths.

Such embodiments advantageously allow the MPIO driver to minimize or otherwise avoid selection of paths associated with a fabric that is currently exhibiting a performance degradation due to an ongoing fabric rediscovery process or other fabric-related issue.

The illustrative embodiments can therefore detect and alleviate performance degradations associated with RSCN storms that result from fabric rediscovery in conjunction with network switch fabric reconfigurations. As a result, improved performance in processing of IO operations is achieved.

Illustrative embodiments can be used to enhance IO resiliency within a given system by leveraging fabric path information. For example, in the case of a given failed IO operation, the fabric-based path selection process can ensure that the path selected for retry of the failed IO operation is associated with a different switch fabric than the path on which the original IO operation failed.

The disclosed functionality can be implemented using a wide variety of different storage arrays and other types of storage systems.

These and other arrangements are advantageously configured to provide efficient path selection even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated fabric-based path selection arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising:
a set of input-output queues; and
a multi-path input-output driver configured to select input-output operations from the set of input-output queues for delivery to the storage system over the network;
wherein the multi-path input-output driver is further configured:
to determine fabric identifiers for respective ones of a plurality of paths from the host device to the storage system, each of the fabric identifiers being associated with one of a set of multiple switch fabrics interconnecting the host device with the storage system over the network;
to monitor performance of the set of multiple switch fabrics; and
to select particular ones of the paths for delivery of the input-output operations to the storage system based at least in part on the fabric identifiers and the monitored performance of the set of multiple switch fabrics;
wherein the multi-path input output driver in selecting one of the paths for delivery of a given one of the input-output operations (i) selects a given fabric identifier of a given one of the set of multiple switch fabrics based at least in part on the monitored performance of the set of multiple switch fabrics and (ii) selects a given one of the plurality of paths having the given fabric identifier;
wherein the paths are associated with respective initiator-target pairs with the initiators being implemented on the host device and the targets being implemented on the storage system;
wherein the initiators of the initiator-target pairs comprise respective host bus adaptors of the host device and the targets of the initiator-target pairs comprise respective storage array ports of the storage system;
wherein the given input-output operation comprises a retry of a failed input-output operation on a first one of the multiple switch fabrics between a first host bus adaptor of the host device and a first storage array port of the storage system;
wherein the given path selected for the given input-output operation is associated with a second one of the multiple switch fabrics between a second host bus adaptor of the host device and a second storage array port of the storage system;
wherein the network comprises a storage area network and the fabric identifiers are associated with respective distinct switch fabrics of the set of multiple switch fabrics interconnecting the host device with the storage system over the storage area network; and
wherein the given one of the plurality of paths is associated with only a single one of the multiple switch fabrics interconnecting the host device with the storage system over the storage area network at a given point in time.

2. The apparatus of claim 1 further comprising one or more additional host devices each configured to communicate over the network with the storage system and wherein each additional host device comprises a set of input-output queues and a multi-path input-output driver configured to select input-output operations from the set of input-output queues for delivery to the storage system over the network.

3. The apparatus of claim 1 wherein the multi-path input-output driver in determining the fabric identifiers for respective ones of the plurality of paths from the host device to the storage system is further configured:
to send a predetermined command over each of the paths; and
to determine the fabric identifiers for the respective paths based at least in part on responses to the predetermined command.

4. The apparatus of claim 3 wherein the predetermined command comprises a Small Computer System Interface (SCSI) command of a particular type.

5. The apparatus of claim 3 wherein the predetermined command comprises at least one of a log sense command, a mode sense command and a vendor unique command.

6. The apparatus of claim 1 wherein the multi-path input-output driver in selecting particular ones of the paths for delivery of the input-output operations to the storage system based at least in part on the fabric identifiers and the monitored performance of the set of multiple switch fabrics is further configured:
to identify a first path that is exhibiting a delayed response time; and
to select paths having respective fabric identifiers that are different than the fabric identifier of the first path.

7. The apparatus of claim 1 wherein the multi-path input-output driver in selecting particular ones of the paths for delivery of the input-output operations to the storage system based at least in part on the fabric identifiers and the monitored performance of the set of multiple switch fabrics is further configured to implement a path selection algorithm that selects particular ones of the paths at least in part as a function of their respective fabric identifiers.

8. The apparatus of claim 7 wherein the path selection algorithm is configured to balance the input-output operations over the set of multiple switch fabrics.

9. The apparatus of claim 1 wherein the given one of the plurality of paths is associated with a first one of the multiple switch fabrics interconnecting the host device with the storage system at a first point in time and is associated with a second one of the multiple switch fabrics interconnecting the host device with the storage system at a second point in time.

10. A method comprising:
configuring a multi-path input-output driver of a host device to communicate with a storage system over a network;
the multi-path input-output driver:
determining fabric identifiers for respective ones of a plurality of paths from the host device to the storage system, each of the fabric identifiers being associated with one of a set of multiple switch fabrics interconnecting the host device with the storage system over the network;
monitoring performance of the set of multiple switch fabrics; and
selecting particular ones of the paths for delivery of input-output operations to the storage system based at least in part on the fabric identifiers and the monitored performance of the set of multiple switch fabrics;
wherein the multi-path input output driver in selecting one of the paths for delivery of a given one of the input-output operations (i) selects a given fabric identifier of a given one of the set of multiple switch fabrics based at least in part on the monitored performance of the set of multiple switch fabrics and (ii) selects a given one of the plurality of paths having the given fabric identifier;
wherein the paths are associated with respective initiator-target pairs with the initiators being implemented on the host device and the targets being implemented on the storage system;
wherein the initiators of the initiator-target pairs comprise respective host bus adaptors of the host device and the targets of the initiator-target pairs comprise respective storage array ports of the storage system;
wherein the given input-output operation comprises a retry of a failed input-output operation on a first one of the multiple switch fabrics between a first host bus adaptor of the host device and a first storage array port of the storage system;
wherein the given path selected for the given input-output operation is associated with a second one of the multiple switch fabrics between a second host bus adaptor of the host device and a second storage array port of the storage system;
wherein the network comprises a storage area network and the fabric identifiers are associated with respective distinct switch fabrics of the set of multiple switch fabrics interconnecting the host device with the storage system over the storage area network; and
wherein the given one of the plurality of paths is associated with only a single one of the multiple switch fabrics interconnecting the host device with the storage system over the storage area network at a given point in time.

11. The method of claim 10 wherein the multi-path input-output driver determines the fabric identifiers for respective ones of the plurality of paths from the host device to the storage system by:
sending a predetermined command over each of the paths; and
determining the fabric identifiers for the respective paths based at least in part on responses to the predetermined command.

12. The method of claim 10 wherein the multi-path input-output driver selects particular ones of the paths for delivery of the input-output operations to the storage system based at least in part on the fabric identifiers and the monitored performance of the set of multiple switch fabrics by:
identifying a first path that is exhibiting a delayed response time; and
selecting paths having respective fabric identifiers that are different than the fabric identifier of the first path.

13. The method of claim 10 wherein the multi-path input-output driver in selecting particular ones of the paths for delivery of the input-output operations to the storage system based at least in part on the fabric identifiers and the monitored performance of the set of multiple switch fabrics is further configured to implement a path selection algorithm that selects particular ones of the paths at least in part as a function of their respective fabric identifiers, and wherein the path selection algorithm is configured to balance the input-output operations over the set of multiple switch fabrics.

14. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:
to determine fabric identifiers for respective ones of a plurality of paths from the host device to the storage system, each of the fabric identifiers being associated with one of a set of multiple switch fabrics interconnecting the host device with the storage system over the network;
to monitor performance of the set of multiple switch fabrics; and
to select particular ones of the paths for delivery of the input-output operations to the storage system based at least in part on the fabric identifiers and the monitored performance of the set of multiple switch fabrics;
wherein the multi-path input output driver in selecting one of the paths for delivery of a given one of the input-output operations (i) selects a given fabric identifier of a given one of the set of multiple switch fabrics based at least in part on the monitored performance of the set of multiple switch fabrics and (ii) selects a given one of the plurality of paths having the given fabric identifier;
wherein the paths are associated with respective initiator-target pairs with the initiators being implemented on the host device and the targets being implemented on the storage system;
wherein the initiators of the initiator-target pairs comprise respective host bus adaptors of the host device and the targets of the initiator-target pairs comprise respective storage array ports of the storage system;
wherein the given input-output operation comprises a retry of a failed input-output operation on a first one of the multiple switch fabrics between a first host bus adaptor of the host device and a first storage array port of the storage system;
wherein the given path selected for the given input-output operation is associated with a second one of the multiple switch fabrics between a second host bus adaptor of the host device and a second storage array port of the storage system;
wherein the network comprises a storage area network and the fabric identifiers are associated with respective distinct switch fabrics of the set of multiple switch fabrics interconnecting the host device with the storage system over the storage area network; and wherein the given one of the plurality of paths is associated with only a single one of the multiple switch fabrics interconnecting the host device with the storage system over the storage area network at a given point in time.

15. The computer program product of claim 14 wherein the multi-path input-output driver determines the fabric identifiers for respective ones of the plurality of paths from the host device to the storage system by:

sending a predetermined command over each of the paths; and determining the fabric identifiers for the respective paths based at least in part on responses to the predetermined command.

16. The computer program product of claim 15 wherein the predetermined command comprises a Small Computer System Interface (SCSI) command of a particular type.

17. The computer program product of claim 15 wherein the predetermined command comprises at least one of a log sense command, a mode sense command and a vendor unique command.

18. The computer program product of claim 14 wherein the multi-path input-output driver selects particular ones of the paths for delivery of the input-output operations to the storage system based at least in part on the fabric identifiers and the monitored performance of the set of multiple switch fabrics by:

identifying a first path that is exhibiting a delayed response time; and selecting paths having respective fabric identifiers that are different than the fabric identifier of the first path.

19. The computer program product of claim 14 wherein the multi-path input-output driver in selecting particular ones of the paths for delivery of the input-output operations to the storage system based at least in part on the fabric identifiers and the monitored performance of the set of multiple switch fabrics is further configured to implement a path selection algorithm that selects particular ones of the paths at least in part as a function of their respective fabric identifiers.

20. The computer program product of claim 19 wherein the path selection algorithm is configured to balance the input-output operations over the set of multiple switch fabrics.

* * * * *